United States Patent
Kim (10) Patent No.: US 8,180,866 B2
(45) Date of Patent: *May 15, 2012

(54) DEVICE MANAGEMENT APPARATUS AND METHOD FOR SETTING CONFIGURATION-VALUE THEREIN

(75) Inventor: Te-Hyun Kim, Gyeonggi-Do (KR)

(73) Assignee: LG Electronics Inc., Seoul (KR)

(*) Notice: Subject to any disclaimer, the term of this patent is extended or adjusted under 35 U.S.C. 154(b) by 399 days.

This patent is subject to a terminal disclaimer.

(21) Appl. No.: 11/911,710

(22) PCT Filed: Jun. 1, 2006

(86) PCT No.: PCT/KR2006/002111
§ 371 (c)(1),
(2), (4) Date: Oct. 16, 2007

(87) PCT Pub. No.: WO2007/001121
PCT Pub. Date: Jan. 4, 2007

(65) Prior Publication Data
US 2009/0031011 A1    Jan. 29, 2009

Related U.S. Application Data

(60) Provisional application No. 60/687,193, filed on Jun. 2, 2005.

(30) Foreign Application Priority Data

May 23, 2006 (KR) .......................... 10-2006-0046291

(51) Int. Cl.
*G06F 15/177* (2006.01)
(52) U.S. Cl. ...................................... 709/221; 713/100
(58) Field of Classification Search .................. 709/221; 713/100
See application file for complete search history.

(56) References Cited

U.S. PATENT DOCUMENTS 5,327,560 A * 7/1994 Hirata et al. .................. 709/221
(Continued)

FOREIGN PATENT DOCUMENTS

CN       1598851 A       3/2005
(Continued)

OTHER PUBLICATIONS

"SyncML Device Management Tree and Description Version 1.1.2" [Online], Dec. 2, 2003 [Retrieved on Jul. 6, 2009], [Retrieved from: http://www.wapforum.com/technical/release_program/docs/DM/V1_1_2-20040113-A/OMA-SyncML-DMTND-V1_1_2-20031202-A.pdf].*

(Continued)

*Primary Examiner* — Philip Chea
*Assistant Examiner* — Eric W Shepperd
(74) *Attorney, Agent, or Firm* — Birch, Stewart, Kolasch & Birch, LLP (57) ABSTRACT

The present invention discloses a DM system and a method for setting configuration values in the same. The DM system includes: a server for generating configuration values for a predetermined resource of a terminal, transmitting the configuration values and a reconfiguration parameter to the terminal through a DM session, and requesting the terminal to set the configuration values; and the terminal for receiving the configuration values and the reconfiguration parameter, and setting the configuration values in the resource according to the reconfiguration parameter, the terminal being operated according to the configuration values. As a result, the server can generate the configuration values and transmit the configuration values to the terminal, and the terminal can directly apply the configuration values from the server.

8 Claims, 5 Drawing Sheets

U.S. PATENT DOCUMENTS

| | | |
|---|---|---|
| 6,289,399 B1 | 9/2001 | Furuichi et al. |
| 6,577,614 B1 | 6/2003 | Cook et al. |
| 2002/0091722 A1 | 7/2002 | Gupta et al. |
| 2002/0143942 A1 | 10/2002 | Li et al. |
| 2003/0091006 A1* | 5/2003 | Peltola .......................... 370/332 |
| 2003/0204640 A1* | 10/2003 | Sahinoja et al. ............. 709/311 |
| 2005/0044196 A1* | 2/2005 | Pullen et al. ................. 709/223 |
| 2005/0044265 A1 | 2/2005 | Vinel et al. |
| 2005/0055397 A1* | 3/2005 | Zhu et al. ..................... 709/200 |
| 2005/0104717 A1* | 5/2005 | Kaplan ........................ 340/5.74 |
| 2006/0015626 A1* | 1/2006 | Hallamaa et al. ............. 709/229 |
| 2006/0200814 A1* | 9/2006 | Kontinen et al. ............. 717/168 |
| 2008/0049694 A1* | 2/2008 | Kinoshita et al. ............. 370/338 |
| 2008/0168127 A1* | 7/2008 | Hernandez .................... 709/202 |

FOREIGN PATENT DOCUMENTS

| | | |
|---|---|---|
| EP | 1104132 A1 | 5/2001 |
| EP | 1104132 A1 * | 5/2001 |
| JP | 10-154093 A | 6/1998 |
| JP | 2003-50755 A | 2/2003 |
| KR | 10-2005-0025913 A | 3/2005 |
| WO | WO 2005/004395 A1 | 1/2005 |
| WO | WO 2006070045 A1 * | 7/2006 |

OTHER PUBLICATIONS

Article by Digital Times, "LG Electronics Co., Ltd, Scheduling Function for Mobile Phone," http://www.dt.co.kr/contents.html?article_no=2005040402010631618004, Apr. 6, 2005.

* cited by examiner

DEVICE MANAGEMENT APPARATUS AND METHOD FOR SETTING CONFIGURATION-VALUE THEREIN

This application is the National Phase of International application PCT/KR2006/002111 filed on Jun. 1, 2006 which claims priority under 35 U.S.C. 119(e) to U.S. Provisional Application No. 60/687,193 filed on Jun. 2, 2005 and under 35 U.S.C. 119(a) to Patent Application No. 10-2006-0046291 filed in Korea on May 23, 2006. Both of these prior applications are hereby expressly incorporated by reference into the present application.

BACKGROUND OF THE INVENTION

1. Field of the Invention

The present invention relates to a device management system and a method for setting configuration-values therein.

2. Description of the Background Art

In general, a device management (hereinafter, referred to as 'DM') technology shows resources of one client (terminal) to a DM server in the form of DM objects existing in a DM tree and enables the DM server to access the resources. Therefore, the DM server can easily manage the terminal.

According to the DM technology, the DM server orders the DM object client to execute a DM command, and the DM object client directly executes the command and reports the execution result. In addition, the DM server can request the DM object client to change/update/delete a specific function.

However, in the above DM technology, when the DM tree and the DM object existing in the terminal are remotely changed by the DM server through a DM session, the changed contents are not directly set and applied in the terminal. For example, when the terminal is rebooted or requested to perform a specific function, the changed contents are set and applied in the terminal.

As described above, the time of setting and applying the changed contents in the terminal is dependent upon implementation of the terminal, which reduces reliability of application.

SUMMARY OF THE INVENTION

An object of the present invention is to provide a DM system and a method for setting configuration-values in a terminal, which enable a server to set the configuration-values at proper time in the terminal.

To achieve these and other advantages and in accordance with the purpose of the present invention, as embodied and broadly described herein, there is provided a DM system, including: a server for generating configuration values for a predetermined resource of a terminal, transmitting the configuration values and a reconfiguration parameter to the terminal through a DM session, and requesting the terminal to set the configuration values; and the terminal for receiving the configuration values and the reconfiguration parameter, and setting the configuration values in the resource according to the reconfiguration parameter, is the terminal being operated according to the configuration values.

Preferably, the terminal includes: a module for receiving the configuration values and the reconfiguration parameter; a module for executing a command to recognize the reconfiguration parameter; and a module for setting the configuration values in response to recognition of the reconfiguration parameter and performing functions Preferably, the server may further transmit a DM command to the terminal. Here, the DM command may be one or more of ADD, DELETE and REPLACE commands for setting the configuration values, or EXEC command for enabling the terminal to recognize the reconfiguration parameter.

Preferably, the DM command is included in a scheduling context with the configuration values, the reconfiguration parameter and a condition for executing of the DM command, and the scheduling context is transmitted to the terminal.

In the case that the scheduling context is transmitted, the terminal includes: a module for receiving and installing the scheduling context; a module for monitoring the condition in the scheduling context; a module for executing the DM command to recognize the reconfiguration parameter, when matching of the execution condition is obtained by monitoring; and a module for setting the configuration values in response to recognition of the reconfiguration parameter and performing functions.

There is also provided a terminal including: a first module for receiving configuration values for a predetermined resource and a reconfiguration parameter from a server; a second module for executing a DM command to recognize the reconfiguration parameter; and a third module for setting the configuration values to the resource in response to recognition of the reconfiguration parameter and performing functions.

The detailed contents of the terminal have been explained above.

In accordance with the present invention, when the terminal receives the configuration values from the DM server, the terminal can directly use the configuration values. As a result, the functions of the terminal can be optimally managed by the time or environment.

The foregoing and other objects, features, aspects and advantages of the present invention will become more apparent from the following detailed description of the present invention when taken in conjunction with the accompanying drawings.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE PREFERRED EMBODIMENTS

Reference will now be made in detail to the preferred embodiments of the present invention, examples of which are illustrated in the accompanying drawings.

Figure 1:
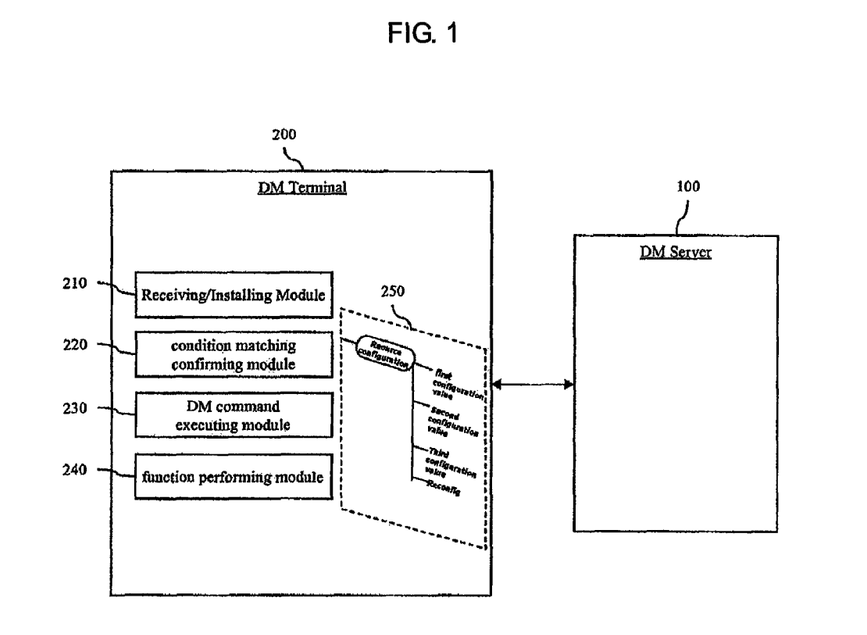
FIG. 1 is a block diagram illustrating a DM system in accordance with the present invention.
Figure 2:
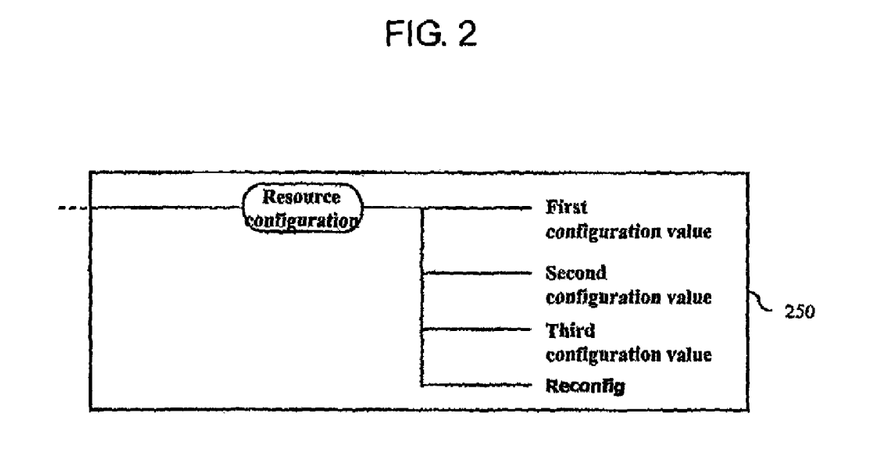
FIG. 2 is an exemplary diagram illustrating a DM tree of FIG. 1.

FIG. 1 is a block diagram illustrating a DM system in accordance with the present invention, and FIG. 2 is an exemplary diagram illustrating a DM tree of FIG. 1.

Referring to FIG. 1, the DM system includes a DM server 100 and a terminal 200. The DM server 100 will now be explained.

The DM server 100 generates configuration values for a predetermined resource of the terminal 200, and transmits the configuration values to the terminal 200 with a reconfiguration parameter, thereby requesting the terminal 200 to set the configuration values and be operated according to the configuration values. Here, the DM server 100 receives the resource of the terminal 200 from the terminal 200 in the form of a DM tree 250, recognizes the resource through the DM tree 250, generates the configuration values, and transmits the configuration values to the terminal 200, thereby making the configuration values set in the DM tree 250. The reconfiguration parameter serves as an indicator for enabling the terminal 200 to set the configuration values in its resource and be operated according to the configuration values.

When transmitting the configuration values and the reconfiguration parameter, the DM server 100 can additionally transmit a DM command. In another case, the DM server 100 can additionally transmit a condition for execution of the DM command with the DM command. For better understanding, exemplary DM commands are enumerated as follows.

GET: read value of DM object in DM tree.
ADD: generate DM object in DM tree.
REPLACE: change existing configuration value of DM object in DM tree, and change configuration value for resource connected to the DM object.
DELETE: delete DM object in DM tree, and delete resource connected to the DM object.
AUTOMATIC: group a few DM commands, and make terminal process or not process the DM commands of one group. That is, if any of the DM commands grouped by AUTOMATIC cannot be executed, the other DM commands cannot be executed either.
UI ALERT: mostly used with other DM commands. Notify selection of user to DM server, when user allows or rejects execution of DM command.
GENERIC ALERT: mostly used to notify event generated in terminal to DM server, when terminal firstly requests DM session.
STATUS: notify processing status of DM-command to DM server.
RESULT: transmit value of DM object which is object of GET command to DM server with STATUS command.

Among the DM commands, ADD, DELETE and REPLACE commands can be used to set the configuration values in the DM tree 250 of the terminal 200, and EXEC command can be used to enable the terminal 200 to recognize the reconfiguration parameter and be operated according to the set configuration values.

The condition makes the terminal 200 execute the DM command, when a value of a specific resource of the terminal 200 reaches a predetermined critical value (critical value-based) or a predetermined time (time-based), or when a specific trap event is generated in the terminal 200. Because the DM server 100 provides the DM command that must be executed in the terminal 200 to the terminal 200 in advance and the terminal 200 executes the DM command in the given condition, whenever the terminal 200 requests the DM command to the DM server 100, the terminal 200 recognizes as if the DM server 100 directly provided the DM command.

When transmitting the DM command, the condition, the configuration values and the reconfiguration parameter to the terminal 200, the DM server 100 can include these items in a scheduling context and transmit the scheduling context. The scheduling context is useful in transmitting two or more of the DM command, the condition, etc. Especially, the scheduling context is very useful in organically connecting and executing two or more DM commands in the terminal 200. The terminal 200 can be systematically managed by organically binding two or more conditions.

On the other hand, the DM server 100 can establish a DM session with the terminal 200 under OMA DM standard, and install the scheduling context in the terminal 200 in the form of a DM tree through the DM session.

If necessary, the DM server 100 can correct the scheduling context installed in the terminal 200, and request the terminal 200 to correct the scheduling context. In addition, the DM server 100 can delete the installed scheduling context in the terminal 200.

Still referring to FIG. 1, the terminal 200 includes a receiving/installing module 210, a condition matching confirming module 220, a DM command executing module 230, a function performing module 240 and a DM tree 250.

The receiving/installing module 210 receives the configuration values and the reconfiguration parameter from the DM server 210 through the DM session, Here, the configuration values and the reconfiguration parameter can be set and stored in the DM tree 250 such as illustrated FIG. 2. FIG. 2 shows part of the DM tree 250 including a first configuration value, a second configuration value, a third configuration value and a reconfiguration parameter Reconfig. The first to third configuration values are configuration values for a predetermined resource of the terminal 200. The function performing module 240 of the terminal 200 can be operated according to the configuration values.

As mentioned above, the receiving/installing module 210 can further receive the DM command and/or the condition for executing of the DM command. In another case, the receiving/Installing module 210 can receive the scheduling context including the configuration values, the reconfiguration parameter, the DM command and the condition. Here, the receiving/installing module 210 can install the scheduling context. Installing the scheduling context means storing the scheduling context in the terminal 200 in the form of a DM tree, if necessary, the receiving/installing module 210 can identify the user and verify validity of the scheduling context before installing the scheduling context.

When receiving the scheduling context from the DM server 100, the condition matching confirming module 220 confirms the condition in the scheduling context, and continuously checks whether the condition is satisfied. Whether the condition is satisfied can be determined by whether a value of a specific resource of the terminal 200 reaches a predetermined critical value (critical value-based) or a predetermined time (time-based), or whether a specific trap event is generated in the terminal 200. When the terminal 200 does not receive the scheduling context from the DM server 100, the condition matching confirming module 220 may not be operated.

The DM command executing module 230 executes the DM command to set and reflect the configuration values. When the terminal 200 receives the scheduling context, if the condition matching confirming module 220 obtains matching of the condition, the DM command executing module 230 executes the DM command in the scheduling context.

The DM command can be one or more of ADD, DELETE and REPLACE commands for setting the configuration values in the terminal 200. In detail, when the DM command executing module 230 executes ADD command, for example, the first to third configuration values of FIG. 2 can be newly set in the resource of the terminal 200. When the DM command executing module 230 executes DELETE command, the configuration values set in the resource of the terminal 200 can be deleted. When the DM command executing module 230 executes REPLACE command, the configuration values set in the resource of the terminal 200 can be replaced by, for example, the first to third configuration values of FIG. 2. On the other hand, the DM command can be EXEC command for recognizing the reconfiguration parameter. In detail, when the DM command executing module 230 executes EXEC command, the function performing module 240 recognizes the reconfiguration parameter such as Reconfig of FIG. 2, loads the first to third configuration values from the DM tree 250 as discussed later, and sets the first to third configuration values at the DM tree 250.

The function performing module 240 performs various functions of the terminal 200. For example, the function performing module 240 can be a microprocessor for operating application software or software (driver) for driving hardware. When recognizing the reconfiguration parameter by executing the DM command, the function performing module 240 sets the configuration values at the DM tree 250 and performs various functions according to the configuration values.

In accordance with the present invention, in the DM system described above, the terminal 200 includes the receiving/installing module 210, the condition matching confirming module 220, the DM command executing module 230 and the function performing module 240. However, the terminal 200 can be comprised of combinations of a processor (not shown), a network interface (not shown) and a storing device (not shown). The DM server 100 can be formed in the same manner.

Figure 3:
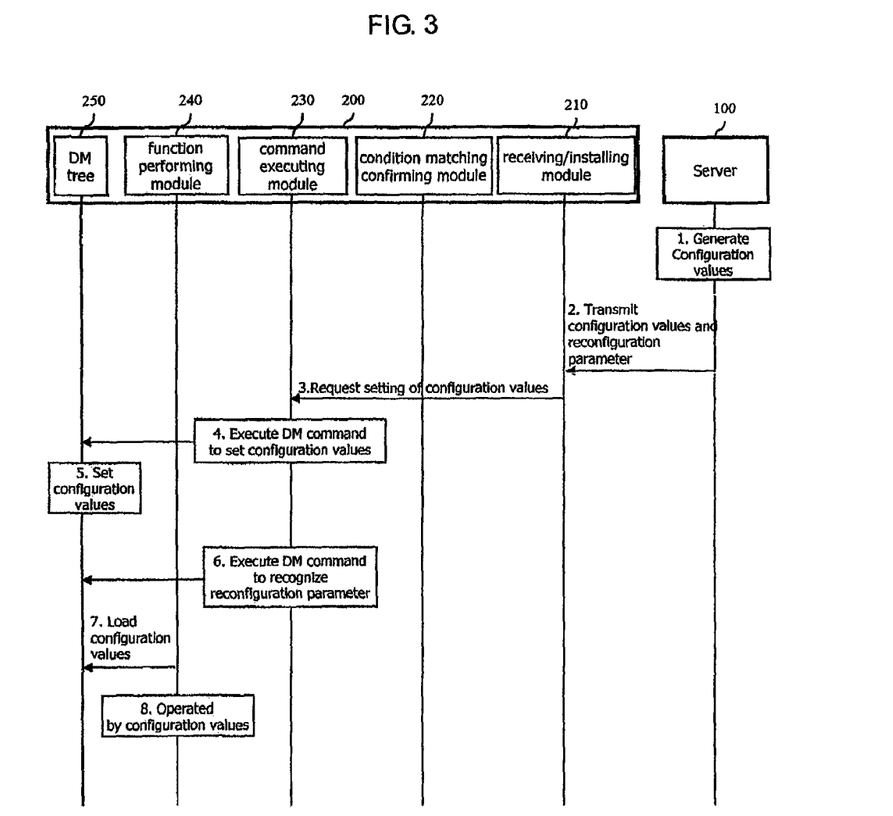
FIG. 3 is a flowchart showing a method for setting configuration values in accordance with a first embodiment of the present invention.

FIG. 3 is a flowchart showing a method for setting configuration values in accordance with a first embodiment of the present invention. The sequential steps of the method for setting the configuration values will now be described with reference to FIG. 3.

1) The server 100 generates configuration values to be set in the terminal 200.

2) After generating the configuration values, the server 100 connects the DM session with the terminal 200, and transmits the configuration values and a reconfiguration parameter to the terminal 200 by using a DM protocol.

3) When the terminal 200 receives the configuration values and the reconfiguration parameter, the receiving/installing module 210 of the terminal 200 transmits a request for setting the configuration values to the DM command executing module 230.

4) The DM command executing module 230 receiving the request executes a DM command. The DM command can be one of ADD, REPLACE and DELETE commands.

5) The configuration values are set in the DM tree 250.

6) The DM command executing module 230 executes a DM command for recognizing the reconfiguration parameter. As described above, the DM command can be EXEC command.

7) In response to execution of the DM command, the function performing module 240 loads the configuration values in the DM free 250.

8) The function performing module 240 sets the loaded configuration values at the DM tree 250 and performs various functions according to the configuration values.

Figure 4:
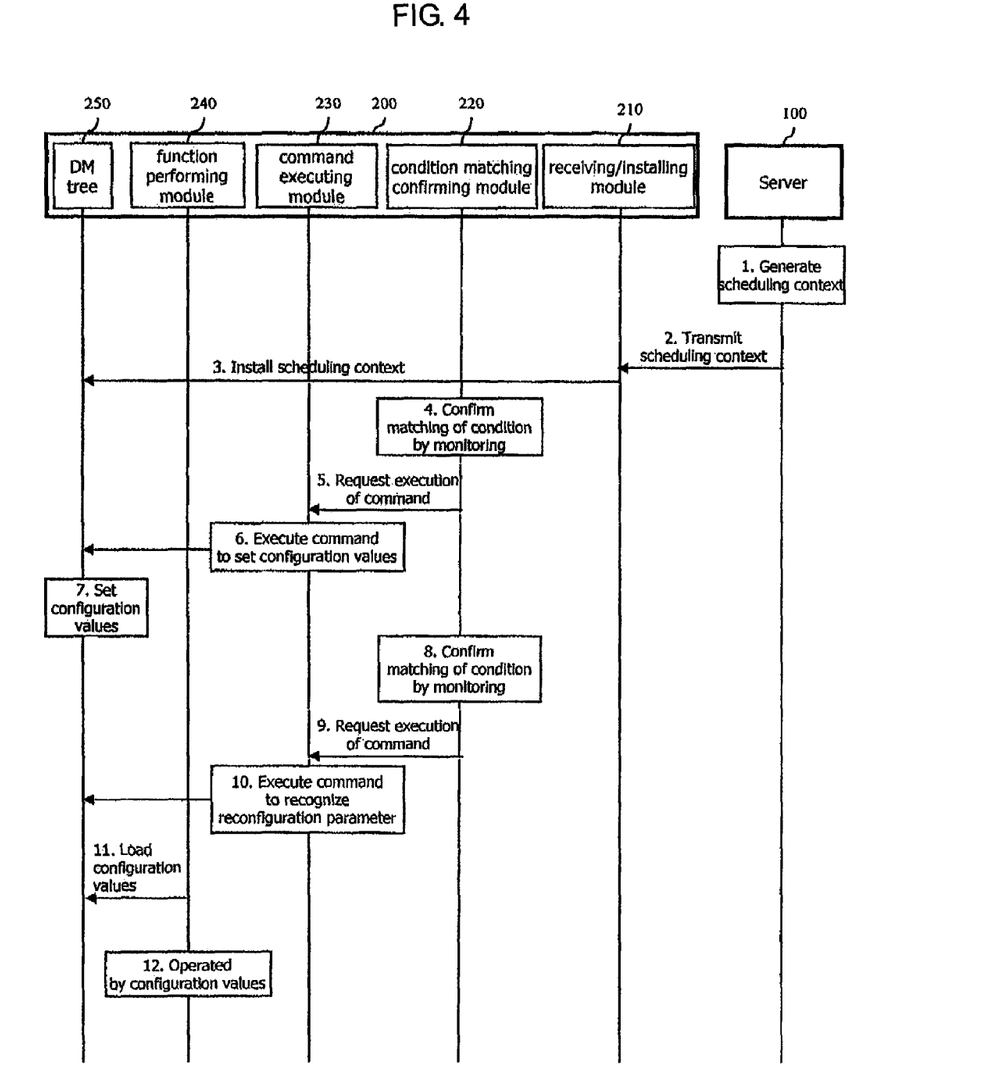
FIG. 4 is a flowchart showing a method for setting configuration values in accordance with a second embodiment of the present invention.

FIG. 4 is a flowchart showing a method for setting configuration values in accordance with a second embodiment of the present invention. The sequential steps of the method for setting the configuration values will now be described with reference to FIG. 4.

1) The server 100 generates a DM scheduling context.

2) The server 100 connects the DM session with the terminal 200, and transmits the DM scheduling context to the terminal 200 by using a DM protocol.

3) The receiving/installing module 210 of the terminal 200 installs the DM scheduling context in the DM tree 250 of the terminal 200.

4) The condition matching confirming module 220 of the terminal 200 confirms and monitors a condition in the DM tree 250 in which the scheduling context has been installed in order to set configuration values.

5) When confirming that the condition is satisfied, the condition matching confirming module 220 transmits a request for executing a DM command to the DM command executing module 230.

6) In response to the request, the DM command executing module 230 loads the DM command in the DM tree 250 in which the scheduling context has been installed, and executes the DM command. As described above, the DM command can be one of ADD, REPLACE and DELETE commands.

7) According to the DM command, the configuration values are set in the DM tree 250.

8) The condition matching confirming module 220 of the terminal 200 confirms and monitors a condition in the DM free 250 in which the scheduling context has been installed in order to set the set configuration values.

9) When confirming that the condition is satisfied, the condition matching confirming module 220 transmits a request for executing a DM command to the DM command executing module 230.

10) In response to the request, the DM command executing module 230 loads the DM command in the DM tree 250 in which the scheduling context has been installed, and executes the DM command. As mentioned above, the DM command can be EXEC command.

11) In response to execution of the DM command, the function performing module 240 loads the configuration values in the DM tree 250.

12) Thereafter, the function performing module 240 sets the loaded configuration values and performs various functions.

Figure 5:
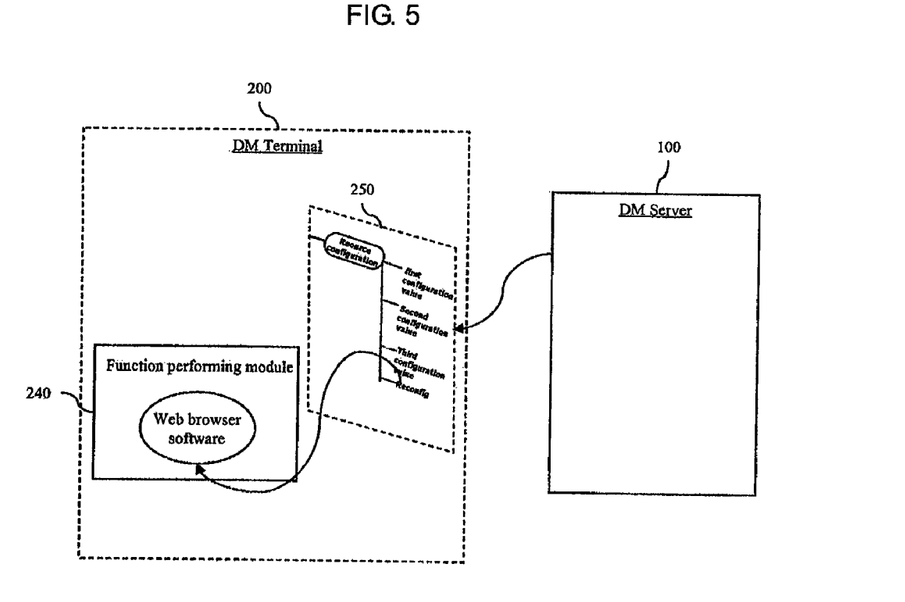
FIG. 5 is an exemplary diagram illustrating an application example of the method for setting the configuration values in accordance with the present invention.

FIG. 5 is an exemplary diagram illustrating an application example of the method for setting the configuration values in accordance with the present invention.

As shown in FIG. 5, when a response speed of a web browser becomes slower, it can be solved by changing the configuration of the web browser or network by using the method for setting the configuration values in accordance with the present invention.

It is presumed that the DM tree 250 of FIG. 5 has first to third configuration values as configuration values for the web browser. Here, the first configuration value is a configuration value for a proxy address of the web browser, the second configuration value is a configuration value for a home URL, and the third configuration value is a configuration value for the network, namely, 3GPP network as a default.

Here, it is presumed that the DM server 100 transmits a scheduling context to the terminal 200, for changing the third configuration value which is the configuration value for the network from 3GPP network to WLAN network, and scheduling EXEC command to apply the third configuration value, when the response speed of the web browser slows down. As explained above, EXEC command enables application of the changed third configuration value by recognizing the reconfiguration parameter, for example, Reconfig.

When the user makes a request for using the web browser, the terminal 200 loads the default configuration value and transmits and receives data through 3GPP network. However, if the signal of 3GPP network is gradually weakened and the response speed of the web browser is reduced, the terminal 200 executes a DM command such as REPLACE according to the scheduling context, thereby changing the third configuration value into WLAN. Thereafter, the terminal 200 executes EXEC command so that the web browser can recognize the reconfiguration parameter such as Reconfig. As a result, in response to recognition of the reconfiguration parameter, the web browser changes network configuration into WLAN according to the set third configuration value and continuously transmits and receives data of the user.

As the present invention may be embodied in several forms without departing from the spirit or essential characteristics thereof, it should also be understood that the above-described embodiments are not limited by any of the details of the foregoing description, unless otherwise specified, but rather should be construed broadly within its spirit and scope as defined in the appended claims, and therefore all changes and modifications that fall within the metes and bounds of the claims, or equivalence of such metes and bounds are therefore intended to be embraced by the appended claims.

What is claimed is:

1. A method for changing network configurations of a communication terminal using a device management tree, the method comprising:
   receiving, from a server:
   a scheduling context including new values for a network configuration,
   a reconfiguration parameter,
   a first device management (DM) command for reconfiguring the network configuration based on the new values in the scheduling context,
   a second DM command for applying the reconfigured network configuration, and
   a condition for executing the second DM command, the condition representing a threshold signal strength value;
   checking the reconfiguration parameter;
   executing the first DM command for reconfiguring the network configuration based on the new values in the scheduling context when the checking of the reconfiguration parameter indicates the scheduling context is to be used for a reconfiguration;
   monitoring whether a signal strength for a communication with a network becomes lower than condition for executing the second DM command; and
   executing the second DM command to apply the reconfigured network configuration when the monitored signal strength becomes lower than condition for executing the second DM command according to a result of the monitoring,
   wherein the new values for the network configuration include values related to a proxy address, a home universal resource location (URL), or a network type, and wherein the network type comprises a wireless local area network (WLAN) or a $3^{rd}$ generation partnership program (3GPP) network, and
   wherein the first DM command is to reconfigure the network type from the 3GPP network to the WLAN network or from the WLAN network to the 3GPP network.

2. The method of claim 1, further comprising:
   establishing a connection to a new network identified by the network type reconfigured based on the new values so that user data is transmitted or received through the new network.

3. The method of claim 2, wherein the first DM command to reconfigure the network type is expressed as "REPLACE".

4. The method of claim 3, wherein the scheduling context, the reconfiguration parameter, the first DM command, the second DM command and the condition are received through a DM session established with the server in compliance with Open Mobile Alliance (OMA) Device Management (DM) standards.

5. The method of claim 4, wherein the first DM command is expressed as "EXEC", and
   wherein the reconfiguration parameter indicating the scheduling context is to be used for a reconfiguration is expressed as "Reconfig".

6. A communication terminal comprising:
   a transceiver configured to receive, from a server:
   a scheduling context including new values for a network configuration,
   a reconfiguration parameter,
   a first device management (DM) command for reconfiguring the network configuration based on the new values in the scheduling context,
   a second DM command for applying the reconfigured network configuration, and
   a condition for executing the second DM command, the condition representing a threshold signal strength value; and
   a processor configured to:
   check the reconfiguration parameter;
   execute the first DM command for reconfiguring the network configuration based on the new values in the scheduling context when the checking of the reconfiguration parameter indicates the scheduling context is to be used for a reconfiguration;
   monitor whether a signal strength for a communication with a network becomes lower than the condition for executing the second DM command; and
   execute the second DM command to apply the reconfigured network configuration when the monitored signal strength becomes lower than condition for executing the second DM command according to a result of monitoring,
   wherein the new values for the network configuration include values related to a proxy address, a home universal resource location (URL), or a network type, and wherein the network type comprises a wireless local area network (WLAN) network or a $3^{rd}$ generation partnership project (3GPP) network, and
   wherein the first DM command is to reconfigure the network type from the 3GPP network to the WLAN network or from the WLAN network to the 3GPP network.

7. The communication terminal of claim 6, wherein the processor is further configured to establish a connection to a new network identified by the reconfigured network type based on the new values so that user data is transmitted or received through the new network.

8. The communication terminal of claim 7, wherein the scheduling context, the reconfiguration parameter, the first DM command, the second DM command and the condition are received through a DM session established with the server in compliance with Open Mobile Alliance (OMA) Device Management (DM) standards.

* * * * *